June 26, 1956  J. A. SERGOVIC  2,751,775
MASONRY BLOCK HAVING AN INTEGRAL MOLDED
FACING LAYER AND METHOD OF MAKING SAME
Filed July 12, 1955  3 Sheets-Sheet 1
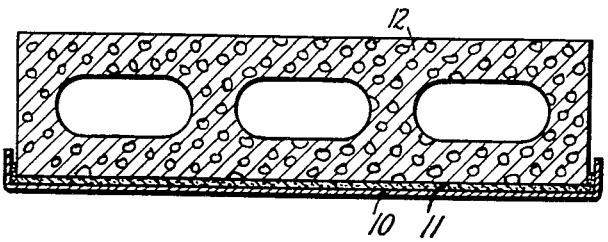
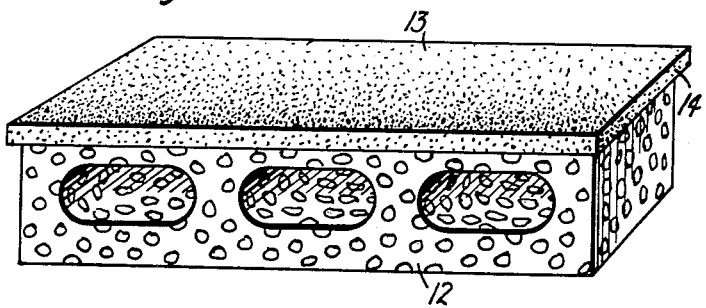
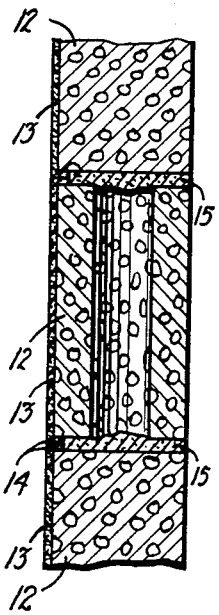
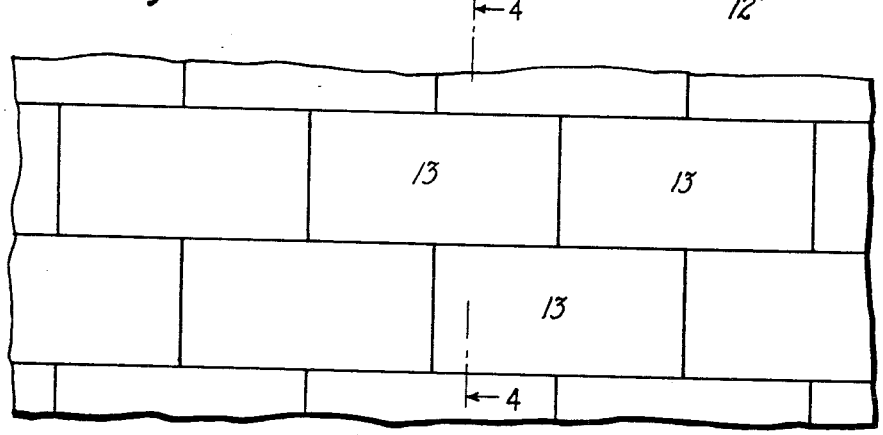
Inventor
John A. Sergovic
By Fish, Richardson & Neave
Attorneys

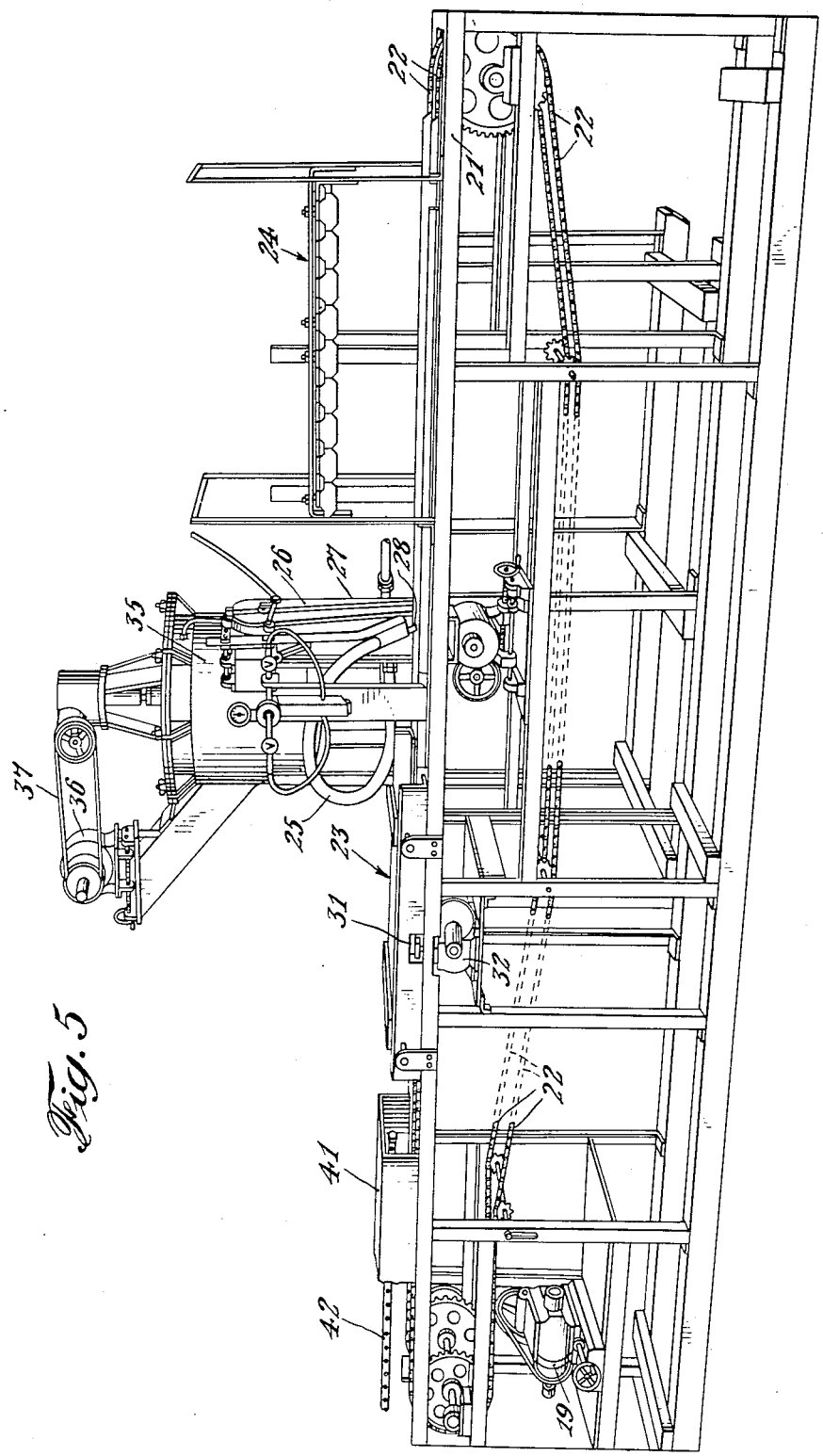

June 26, 1956   J. A. SERGOVIC   2,751,775
MASONRY BLOCK HAVING AN INTEGRAL MOLDED
FACING LAYER AND METHOD OF MAKING SAME
Filed July 12, 1955   3 Sheets-Sheet 3
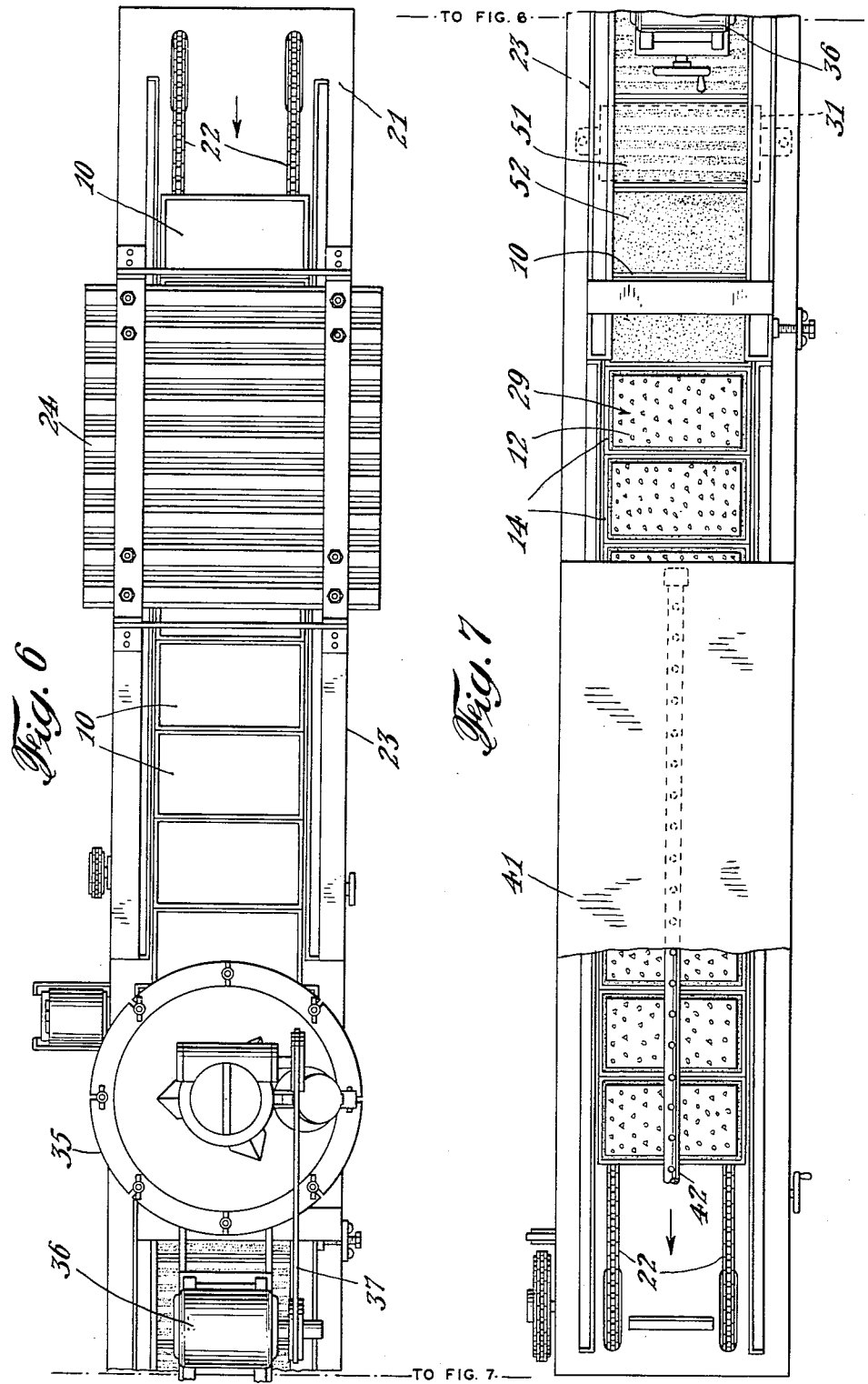

United States Patent Office 2,751,775
Patented June 26, 1956

2,751,775

MASONRY BLOCK HAVING AN INTEGRAL MOLDED FACING LAYER AND METHOD OF MAKING SAME

John A. Sergovic, Baltimore, Md., assignor to The Burns & Russell Company of Baltimore, Baltimore, Md., a corporation of Maryland Application July 12, 1955, Serial No. 521,529

10 Claims. (Cl. 72—35)

This application is a continuation-in-part of my copending application, Serial No. 402,485, filed January 6, 1954, which is in turn a continuation-in-part of my copending application, Serial No. 225,218, filed May 8, 1951, which is in turn a continuation-in-part of my copending application, Serial No. 72,253, filed January 22, 1949, all now abandoned.

This invention relates to coated masonry building units, coating compositions therefor and a novel method of producing the coated masonry building units of the invention. More particularly, the invention relates to the coating of masonry building blocks such as those made from cinders, slag, cement, haydite, clay or the like to produce an adherent, dense, hard coating on at least one face thereof.

Building units of the type mentioned above are more or less porous, and in general those that can be produced most economically are the most porous and present the greatest difficulty in applying a decorative or impervious finish to a wall constructed from them. For example, a wall made of cinder block has a very rough porous surface which is extremely difficult to paint or coat in any suitable fashion to produce a smooth, attractive surface. Liquid coating agents are difficult to apply to such a surface, are absorbed or soaked into the surface, thus becoming somewhat dissipated, and do not readily bridge over the pores to conceal surface imperfections in the blocks.

I have found that such building units or blocks can be coated before being used to form a building structure, and to produce in a simple, economical manner a surface on the exposed faces of the block that is resistant to mechanical injuries, staining and temperature changes, that can be applied in different colors, that renders the block substantially impervious to moisture, and that can be used to produce any desired surface finish, either smooth, patterned or irregular.

One object of my invention is the provision in individual masonry building units or block which are coated on one or more faces with a novel resinous composition to produce a decorative, serviceable surface thereon which does not require any finishing after a wall is erected with the blocks.

Another object is the provision of a coating composition utilizing as its principal active ingredient a polyester type of resin with a monomeric polymerizable solvent that does not give off volatile matter during curing, and which comprises at least 50% by weight of an inert mineral filler, such as sand, preferably graded sand. While, for example, calcium carbonate is relatively cheap, it is not as good as sand, and asbestos, also relatively cheap, is likewise not as good as sand, and further is best used in amount not greater than about 80%.

An additional object of my invention is the provision in individual masonry building units or blocks, and a novel process for producing them, which blocks are coated on one or more faces with a novel resinous composition to produce a decorative, serviceable surface thereon which does not require any finishing after a wall is erected with the blocks.

Another object of the invention is the coating of individual masonry building units or blocks in simple, shallow, individual molds to give the desired surface finish and which utilizes the weight of the building unit as a source of pressure in applying the coating surface.

A further object is the provision of a novel, efficient and economical coating process which utilizes a coating composition containing as its principal active ingredients a polyester type of resin and a monomeric polymerizable solvent which polymerize with each other without producing volatile or incompatible matter during curing and which also permits a large concentration of relatively inexpensive granular filler material without any undue sacrifice in the flowability of the coating composition or the properties of the applied coating.

These and other objects of the invention will be better understood by reference to a description of the invention in connection with the accompanying drawings, in which:

Figure 1 is a vertical sectional view of a mold showing a masonry building unit in section during the coating operation.

Figure 2 is a perspective view of a coated block produced in accordance with the present invention.

Figure 3 is a side elevational view of a section of a completed wall made of block with the coated faces exposed.

Figure 4 is a sectional view of this wall taken approximately on the line 4—4 of Figure 3.

Figure 5 is a perspective view of one desirable form of apparatus used in performing the novel process of the invention.

Figures 6 and 7 when taken together constitute an interrupted plan view of Figure 5. These two Figures show the progress of the coating process in going from right to left, starting with Figure 6 and then going to Figure 7.

Referring to the broader aspects of the process for producing the novel coated building unit of my invention, the building unit to be coated may be located in a relatively shallow mold or tray which may be made of metal, such as stainless steel, or other suitable material. The mold may be desirably, although not necessarily, lined with a glass enamel, frit or porcelain, and is preferably only slightly larger inside than the dimensions of the face of the building unit to be coated. A quantity of the pre-mixed resinous coating composition of the invention which is to be applied is placed in the mold sufficient to cover the bottom surface thereof. The building block or unit to be coated is lowered into the mold with the face to be coated downward. Thus, the weight of the block itself presses this face against the coating material, and the resin is cured while the block is in this position. This may be accomplished by heating the block in the mold, if necessary, to any suitable temperature such as 150°–350° F., or higher, but preferably 190°–220° F., when live steam is used as the source of heat. Usually only a relatively short curing or baking cycle is required. A period of 0.5 up to 6 hours has been found to be satisfactory where curing is effected with live steam. When dry heat is used at the higher temperatures a shorter time of 10 to 60 minutes will suffice.

The coated block is then removed from the mold, and the coating will, of course, have an outer surface corresponding in finish to the surface of the bottom of the mold. The preferred coating compounds of the invention shrink to some degree upon curing, thus making it easier to remove the molds. The coating surface that may be obtained by the process of the invention may be produced within uniformly fine tolerances to provide a dimensionally true surface. This reduces to a minimum any imperfections in any wall surface due to differences in height or width of the individual block. This is an important advantage over the prior art.

Referring more particularly to the drawings, numeral 10 indicates a shallow tray or mold containing a quantity of resinous coating material 11. In Figure 1, the block to be coated, which in this case may be an ordinary cinder block 12, has been introduced into the mold and the resinous composition may be at least partly cured in contact with the face of the cinder block. The amount of penetration of the coating composition into the pores of the cinder block is dependent on the pressure produced by the weight of the block, the porosity of the block and the consistency of the coating composition. This amount of penetration can be controlled to some extent by adjustment of the time of introducing the block into the mold containing the coating composition. If the block is introduced after the composition has begun to gel, penetration will be reduced.

Figure 2 illustrates in perspective a coated cinder block which shows that the coating composition has formed a smooth surface rectangular face 13 with a lip or edge portion 14 that extends over and around the side edges of the block 12. The amount of the coating composition that adheres to the side edges of the block adjacent the face being coated, or lip, as indicated at 14, can be varied by the closeness of the fit of the block to the sides of the mold.

Figures 3 and 4 illustrate a section of wall erected with coated block of my invention. In this case the lip or overlap 14 of the coated faces 13 may, if desired, be fitted together so as to conceal the mortar 15 between the blocks 12. In this way a smooth coated wall surface is provided as shown in Figure 3 with only various lines to indicate the joints between blocks. Whether this form of wall structure, or the customary structure with mortar showing at the joints, is obtained depends simply on the size of the overlap or lip at 14 and the thickness of mortar applied between the blocks.

The preferred aspects of my novel process for producing a masonry building unit according to the invention will be described in more specific detail with reference to Figures 5, 6 and 7 of the drawings. Figure 5 shows in perspective view the processing apparatus preferred for use in the coating operation. Figures 6 and 7 taken together constitute a plan view, partially cut away, of Figure 5. Molds to be used in the coating operation are first prepared for filling. For steam curing, the preferred molds, such as illustrated in Figure 1, are those constructed of steel and which may be coated at least on the inner surface with a substantially pure glass enamel, such as the frit marketed by the Pemco Company designated as No. 3109, or porcelain. Best results are obtained when the enamel surface does not contain a pigment, such as titanium. The enamel surface provides a continuous inner surface free of crevices, etc., which might result in sticking of the finished coated block to the mold. In order to provide a consistently smooth, glossy, clean facing to the coated block, it is desirable to periodically fire-glaze the porcelain or enamel surfaces by heating at a temperature of 1300° F. to 1450° F. While it may be necessary to fire-glaze the molds only after every two or three uses, it may be desirable to fire-glaze the enamel coating after each use. If used for dry-air curing, stainless steel molds are satisfactory; although as will be described hereinbelow, when a drier of the prescribed type is used in the coating composition, excellent results, with only occasional fire-glazing, may be obtained with porcelain coated molds using steam to cure the resin. The molds should be designed to provide a definite taper to all vertical surfaces to permit easy withdrawal of the finished coated block.

The molds 10 are passed along a conveyor table 21 by a conveyor chain 22 driven by a conveyor drive 19 of the loading unit 23. The molds are first passed under a preheater 24 such as provided by a tank of electric strip heaters or infra red lamps. The preheating treatment is important as it removes any residual moisture which may have condensed from the air upon the surface of the mold. All moisture must be removed if sticking of the coating material to the molds is to be prevented.

The molds 10 pass along the conveyor table from under the preheater from right to left to a position under the nozzle 28 of the coating composition charging unit 27. This apparatus is equipped with a discharge tube 25 motivated by an oscillating driving mechanism 26 (which may be a swinging arm or spiral cut screw) which shall produce a constant velocity motion in passing the nozzle 28 of the discharge tube across the face of the molds in a plane which is at right angles to the path of travel of the molds. The oscillating discharge nozzle 28 deposits during its sweep across the face of the mold a measured amount of coating composition which is evenly deposited across the bottom surfaces of the molds. Constant velocity oscillating motion is recommended, as simple harmonic motion, such as that of a freely swinging pendulum, will cause the molds to be loaded unevenly with buildup of coating composition at both ends of the mold. The discharge tube 25 is connected to a mixing vessel 35 containing the mixed coating composition.

The molds which have been charged with coating composition are next passed over a shaker device 31 by the conveyor chain. The shaker device is a mechanical shaker which may be powered by an electric powered Syntron vibrator 32 or an air driven vibrator. The vibrator action completes the leveling out of the coating composition as shown by comparing molds at 51 and 52 of Figure 7 and tends to remove any entrained air remaining in a coating slurry.

The molds are then charged with masonry building blocks such as the type shown in Figure 1, or other type blocks to be coated, at position 29 and passed on into the curing chamber 41. The building blocks or units are preferably preheated to the curing temperature prior to placing them face down in the molds. The curing chamber may be a long tunnel which may suitably be 2 feet in diameter if round in cross-section, or if rectangular 2 feet x 2 feet, and about 110 feet long. The conveyor chain completes the travel of the molds containing the block faced with coating composition. The weight of the building blocks provides pressure to aid in bringing the coating composition into contact with the block surfaces. The curing chamber shall be heated through its entire length by a suitable source of heat, such as a perforated steam pipe 42 running the length of the chamber. Sufficient live steam is delivered to the curing chamber to maintain a temperature of 190° F. to 220° F. When live-steam curing is used, the minimum time of curing is 0.5 hour. There is apparently no limit as to maximum time with satisfactory results having been obtained after 6 hours.

After curing, the finished coated building blocks are lifted from the molds.

The mixing vessel 35, mentioned above, is preferably capable of accommodating both substantial vacuum (such as 28 in. of mercury) and air pressure (in the value of as 41 lbs. per sq. in.). It is equipped with an agitating device for mixing which may be driven by a motor 36 connected by a belt 37. A number of mixing vessels may be connected in series, if desired. While the ingredients of the coating composition of the invention are being mixed, the vessel is desirably subjected to vacuum of up to about 28 in. of mercury, although as a practical matter low pressures, such as 15–20 in., are satisfactory. This results in a substantial removal of occluded air in the slurry of the coating composition. Unless the vessel is evacuated, the facing of coating material may have small holes after curing. After the mixing and evacuation of the coating composition, the vessel is subjected to compressed air pressure in the order of about 5 to 30 lbs. per sq. in. to aid in forcing or extruding the rather viscous slurry of coating composition out of the discharge tube 25 attached to the oscillating mechanism and into molds.

I have found that is advantageous to bring the temperature of the slurry to about 60° to 70° F. or above at the time of extrusion as at this temperature the viscosity of the slurry is reduced to a more flowable state. Below this temperature the viscosity increases sharply. This is also important from the standpoint of removing entrained bubbles of air. It is extremely difficult to remove air bubbles from viscous slurries and even vibration of the slurry in the bottom of the mold is only moderately effective. The presence of air bubbles in the slurry results in pinholes in the glazed finish and other undesirable consequences such as cracks on the surface of the cured finish.

The coating composition of the invention includes a polyester type of resin, whatever catalyst may be necessary to produce curing of the resin, a monomeric polymerizable solvent that does not volatilize when the resin is cured, one or more suitable finely-divided fillers or aggregates, and, if desired, pigment or coloring material.

The polyester resins are a class of resins with which the resin chemist is familiar. These are ethylenically unsaturated alkyd resins. The preferred resins of this class for employment in the coating compositions of the invention are the polymeric ester reaction products of one or more dicarboxylic acids and one or more polyhydric alcohols. Desirably one or more of these reactants shall contain a reactive double bond or ethylenic linkage. Among the dicarboxylic acids which may be used are phathalic, malic, maleic, fumaric, adipic, pimelic, suberic, sebacic, itaconic, citraconic, and succinic acids and their anhydrides. It is essential that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is the most satisfactory polyhydric alcohol. One may use an unsaturated monohydric alcohol in place of part of the polyhydric alcohol. A typical example of such an alcohol is allyl alcohol which produces an allyl ester of the dicarboxylic acid. The polyester resins may be suitably modified or plasticized by the incorporation of alcohols, fatty acids, etc., to modify the chemical and physical characteristics as desired. The polyesters should comprise upward from about 15% or 30% and preferably 50% to 85% by weight of the resin and resin forming component, e. g., styrene, of the coating composition.

The resin component of the coating composition should also contain a non-volatile, monomeric, cross-linking solvent for the polyester resin. The function of this solvent is to make the polyester resin more fluid and also to crosslink the polyester resin at the time of curing to produce a cross-linked, or three dimensional resin with the polyester resin which is thermosetting in character. This monomeric solvent is an important member of the resin component, for it provides the necessary fluidity to the resin component, imparts thermosetting characteristics to the cured resin and is consumed during the curing of the resin without forming volatile materials. This freedom from volatility is highly important for otherwise the release of volatile matter would produce bubbles, voids or pinholes on the surface and throughout the finished coating of the building block. The lack of volatile matter permits curing when under pressure without requiring provision for vents, etc., in the mold. Also, escaping combustible, volatile matter may produce explosions, or fire hazards.

Among the monomeric polymerizable solvents which may be used are the hydrocarbons: styrene, vinyl toluene, e. g., o-vinyl toluene, p-vinyl toluene, and m-vinyl toluene, cyclo-pentadiene; vinyl acetate; diallyl esters, e. g., diallyl phthalate and triallyl cyanurate, as well as alpha methyl styrene. Styrene has produced the most satisfactory results thus far.

When produced commercially, these resin compositions also contain a small amount of a polymerization inhibitor so as to prevent gelation during storage prior to usage. Such inhibitors include the well-known antioxidants; hydroquinone, t-butyl catechol, quinone, etc.

Polyester resins of the character contemplated for use in the present invention are sold in the trade and identified as "Paraplex" or "Vibrin" resins. In general, these resins. In general, these resins are unsaturated high molecular weight polymers made by reacting one or more acids or a blend of acids, such as maleic or fumaric acid, with a dihydroxy alcohol, such as ethylene glycol. The specific properties of these resins vary depending largely upon the type and amount of each constituent in the combination. For best results, I prefer to employ a mixture of two different types of such resins. Certain of these resins form masses upon curing that are very rigid or inflexible, while others form more flexible rubbery masses. For the coating composition of my invention, I prefer to use a mixture of the rigid and flexible resins, and have found that with resins commercially available about 2 to 5 parts of rigid resin and 1 part of flexible resin produce excellent results. These proportions may, of course, be varied within wide limits depending upon the particular properties desired for the cured coating layer and the properties of the resins that are mixed.

I prefer to mix the resin and monomeric polymerizable solvent, such as styrene or other vinyl monomer, such as vinyl acetate and vinyl toluene, with finely-divided filler, preferably a mineral filler, or aggregate to form a coating composition having the consistency of a thick slurry. Styrene is recommended because of lower cost and other advantages. For this purpose the liquids may be proportioned in the ratio of about 30% or preferably 50% to 85%, or more, by weight of resin solids and the balance styrene or other solvent. About 40% resin solids and 60% styrene gives a good workable consistency.

The filler may vary greatly as to kind and amount and may include such materials as the calcium carbonates, clays, burned clays, glass beads, asbestine, diatomaceous earth, silica flour, granular marble, sand and other natural or manufactured granular particles which may be blended together. The filler is an important part of the coating composition since it provides, in a sense, a diluting medium enabling savings of the more expensive polyester resins and also contributes very desirable properties of its own in providing a satisfactory coating. I have found that sand is an excellent material for this purpose and that it greatly increases the hardness and strength of the coated surface. Sand slows down the wick action which tends to draw the liquid up into the pores of the block being coated, eliminates holes and cracking and improves the ability to strip the coated block from the molds after curing.

It is desirable that the filler used consist of rounded particles. Rounded particles will nest more closely together than will rough, irregular shaped particles. Rounded particles will slide past one another more readily than rough, irregular particles and are thus extremely beneficial in enhancing the flowability of the slurry mix. Because of this latter property they permit substantial savings in the amount of polyester resins required as it becomes possible to increase the filler concentration. It is for this reason that sand is a preferred source of filler, for most sand particles are more smooth and rounded than are many of the other filler materials.

In order to provide a more desirable coating, I have found that precoated or preresinated filler materials are very satisfactory. Preresinated filler, particularly preresinated, extremely finely-divided (less than 325-mesh) calcium carbonate and silica flour, contribute important advantages to the coating composition of the invention. Preresinating the extremely finely-divided calcium carbonate and silica flour is accomplished by treatment with a silicone-containing solution, e. g., polydimethyl siloxane in a solvent, varnish or other liquid resinous material, e. g., melamine formaldehyde and urea formaldehyde, draining off the excess liquid, baking the resin film hard in a hot air oven while mixing the particles from time to time to prevent their sticking to each other. This provides a component which contributes greater flowability to the slurry mix. This is somewhat surprising since these materials will also increase the viscosity of the slurry. The increase in viscosity aids in suspending the larger size filler particles. The increase in viscosity imparted to the slurry also prevents separation of filler at the bottom of the mold and liquid resin at the top of the coating mix adjacent to the building unit. If separation were to occur, it would be made difficult to obtain a full lip to the block.

Preresinating of an extremely finely-divided component of the filler also imparts increased resistance to staining of the facing of the building unit. It is the filler which usually absorbs stains, and if the filler material is precoated with a resin, particles of filler on the surface of the block coating become more resistant to staining.

It is often advantageous to preresinate filler particles of all sizes used in the coating since this serves to provide particles which are smoother and rounder and thus imparts greater flowability to the slurry. Because of the greater flowability, less liquid resin is required. But perhaps the most important advantage is in the increased resistance of the coating to stains.

I have discovered that by using filler materials having a gradation of particle sizes a number of advantages may be obtained. This feature is an important phase of my invention. It is advantageous to be able to use a coating composition having the greatest possible ratio of filler to resin. Not only are the resins substantially more expensive, but the fillers contribute essential properties to a satisfactory facing. By using a gradation of particle sizes, I have found that I can increase the amount of filler from as much as 40% to 400% or 500% per weight of liquid resin component without sacrificing any process economies or flowability of the composition and yet obtain a superior coating. By using a gradation of particle sizes, it is possible to obtain filler material which approaches maximum density by reducing the open void spaces between the filler particles to a minimum. This makes it possible to use a smaller amount of resin in filling the voids and yet provides a rugged coating.

The gradation of particle size of filler material increases the flowability of the slurry mix enabling the slurry to move readily through restricted openings of the slurry charging equipment when under pressure. The smaller particles are believed to serve as a lubricant for the movement of larger particles. It is quite important that the slurry mix have satisfactory flow characteristics if a satisfactory glazed block is to be obtained. By imparting greater flowability, it is possible to obtain both easier charging of the molds and better leveling of the slurry in the mold. It is also easier to obtain a homogeneous layer of slurry. This prevents the formation of resin-rich and resin-starved areas and a resulting undesirable difference in shrinking rate during the curing operation. Since the slurry has excellent flow properties it will flow into the voids, holes and interstices of the building unit to a desirable depth and provide an effective bond upon curing. Because of the satisfactory flow properties, it is possible to obtain a lip which is "full"; that is, as wide as the edge of the mold is high. The resulting full lip is also more resistant to breakage during shipment and handling on the job.

Gradation of particle size also makes it possible to have a coating of optimum hardness. Most inorganic fillers have a hardness greater than that of resins. Therefore, the more filler than can be concentrated at the surface of the facing, the harder the facing will be. By gradation of filler particle sizes, it is possible to approach maximum density and obtain a facing having an optimum concentration of filler present in the mix.

Also, because of its excellent flow characteristics, the filler material is dispersed more uniformly throughout the slurry, providing a facing which is of optimum uniformity in color, gloss and texture.

In general, the gradation of particle size of the filler should be such that there is a gradual diminution in the quantity of material (by weight) corresponding to each sieve size as one goes from larger to smaller standard sieve sizes. Stated in another way, the percentages by weight of the portions of larger sized particles retained by each standard sieve size should be greater than those of the portions of smaller sized particles. I have found that for best results when using sand as the filler, the maximum particle size should be that of a 40-mesh sieve (0.0165 inch), i. e., retained by a 40-mesh sieve but not retained by a 30-mesh sieve (0.0232 in.).

In practice, satisfactory results may be obtained by using particles having at least two general particle size classifications, one of which may be said to be of large size (in the order of 30–70 mesh) and another of small size in the order of 100–325 mesh). It has been found desirable to employ a major proportion, and preferably 60% or more, by weight, of the large size particles. One particularly successful gradation has been one in which about 65% by weight of the filler is of sand of approximately 40–70 mesh and 35% is of 70–140 mesh size. I have found also that a gradation of 80% of the former mesh size and 20% of the latter is equally satisfactory.

In addition to using a gradation of particle size of filler material, I prefer to use some filler of extremely small particle size, in the order of 325-mesh or smaller. Such material is sold under the designation "silica flour" or "Surfex." I prefer to add this material to the liquid resin component of the coating composition.

A suitable catalyst should be added to the resin mixture just prior to the addition of the filler or after the addition of the filler. Coating slurry containing polymerization catalyst should be placed in the molds and the coating operation completed within a short period of time, otherwise the coating slurry may become too viscous for convenient extrusion from the charging equipment and subsequent handling as a result of premature polymerization. Occasionally satisfactory results may be obtained by adding the catalyst to the coating slurry after it has been poured into the mold. This practice is not recommended as the catalyst does not, as a rule, become intimately mixed into the slurry and uneven polymerization results.

A large number of oxidizing catalysts such as dicumyl peroxide, cumene hydroperoxide, benzoyl peroxide and the like, with which those skilled in the resin art are familiar, may be used satisfactorily. These catalysts, however, do not produce the most dependable or reproducible results. For better results and for more uniform dependability, I have discovered that methyl ethyl ketone peroxide, either alone or admixed with one of the other peroxides, notably benzoyl peroxide, should be used. This catalyst gives much more satisfactory results than does benzoyl peroxide, which has heretofore been the catalyst of choice of polyester resin chemists. I have also discovered that methyl ethyl ketone peroxide should be used in greater concentration for optimum results than benzoyl peroxide and other catalysts. The optimum concentration of methyl ethyl ketone peroxide is about 4% of the resin weight whereas the general practice in the art for other catalysts is the use of an amount of from 0.5% to 2%. Unless I use 4% of the preferred catalyst, the facings obtained are often badly discolored and unacceptable.

I have found that the use of metallic driers in combination with the peroxide catalysts, and particularly with either benzoyl peroxide or methyl ethyl ketone peroxide, imparts unexpected advantages to the process. When, for example, methyl ethyl ketone peroxide and manganese naphthenate are used together in the proportions of about 2% of the former and about 1½% of the latter by weight of the resins, the face of the resulting block coating possesses a pleasing, high degree of glossiness. When, for example, about 2% benzoyl peroxide and about 1½% manganese naphthenate and about 0.5% cobalt naphthenate are used equally, satisfactory results are obtained when using hot-air curing. What is also very important from the standpoint of process efficiency is the substantial freedom from sticking of the coating to the mold which is obtained. Additionally, the use of this combination of catalysts alleviates the necessity of fire-polishing the molds on more than infrequent occasions. This results in important savings in costs, for fire-polishing requires additional expense and delays in the process.

The metallic driers discussed above are materials with which those skilled in the art, and particularly in the paint art, are familiar. These materials are metal salts of an organic acid, such as naphthenic acid. The primarily important driers are cobalt, manganese and iron naphthenates. I prefer to use manganese naphthenate, which is introduced in the form of a 6% solution, as the drier.

It has been found to be desirable to incorporate into the coating slurry a small percentage of a cation modified clay. Such clay products are disclosed in U. S. Patent No. 2,531,427, which issued on November 28, 1950, to Ernst A. Hauser. These cation modified clays are essentially clays, such as bentonite, which normally possess cation exchanging properties and which have in place of the normal exchangeable cation an onium base. Such onium base derivatives of the clays are the ammonium, phosphonium, oxonium, sulfonium, arsonium, stibonium and telluronium derivatives. The quaternary ammonium base clays are preferred. Excellent results have been obtained by incorporating about 1½% to 2% by weight of dimethyldioctadecylammonium bentonite per weight of mixed resins. This particular onium base derivative is supplied by the National Lead Company under the trade name "Bentone 34." This material has a specific gravity of 1.8 and is desirably of a small particle size, such as 0.05 to 1.0 micron in length.

The exact function of the onium base clays in the slurries and coating of the present invention is not understood. However, the presence of these materials in the finished coating imparts a significant improvement in the stain resistance of the coating. In spite of many attempts to solve the staining problem by various means, the use of the onium base clays has been the only means of satisfactorily solving the problem.

I have also found that it may be desirable to add additional ingredients to the coating composition to insure the production of a surface that is non-combustible. This property will not always be required, however, so that such additions are entirely optional. I have found that the addition of antimony trioxide and chlorinated paraffin even in small amounts is sufficient for this purpose, although other materials such as tricresyl phosphate may be used in place thereof.

In order that my invention may be more clearly understood, the following specific examples of the invention are given:

*Example 1*

A coating composition was prepared by stirring in a mixing vessel just prior to the coating operation an initial mixture having the following composition:

A mixture of about 27% by weight of polyester resins made up of 3 parts of rigid type polyester resin (Paraplex P43, believed to be a condensation product of propylene glycol and dipropylene glycol in the ratio of 1 to 3 with phthalic anhydride and maleic anhydride in the ratio of 3 to 2) and 1 part of flexible type polyester resin (Paraplex P13, believed to be a condensation product of ethylene glycol and diethylene glycol with phthalic anhydride, maleic anhydride and adipic acid), 23% by weight of styrene monomer, 5% by weight of titanium dioxide as a pigment, and about 45% by weight of #325-mesh asbestine _____lbs__ 25.5

To this initial mixture were added the following:

Styrene monomer (solvent) _____lbs__ 6.5
Bentone 34 (dimethyldioctadecylammonium bentonite) _____lb__ 0.5
Methyl ethyl ketone peroxide (catalyst) _____cc__ 250
Manganese naphthenate (catalyst) _____lb__ 0.4

The resulting mix was agitated and to it was added promptly the following fillers:

86 lbs. crystal silica sand having the following approximate sieve analysis:

| Sieve sizes: | Approx. percentages |
|---|---|
| No. 40 | 38.0 |
| No. 50 | 41.0 |
| No. 70 | 14.0 |
| No. 100 | 4.0 |

22 lbs. banding sand having the following approximate sieve analysis:

| Sieve sizes: | Approx. percentages |
|---|---|
| No. 50 | 0.9 |
| No. 70 | 20.0 |
| No. 100 | 48.2 |
| No. 140 | 20.9 |
| No. 200 | 7.0 |
| No. 270 | 2.5 |

After mixing under a vacuum of 28 in. of mercury for about 15 minutes, the coating composition was subjected to an air pressure of 30 lbs. per sq. in. and forced into empty, preheated molds for processing in accordance with the detailed preferred procedure described earlier in this specification. After curing the composition on the building unit at 212° F. with live steam for 0.5 hour, a coated block was obtained which had an excellent adhesion of the coating to the block and which was resistant to marring, scratching, thermal shock, staining, crazing, etc. The coated face of the building block was found to be waterproof and very decorative in appearance.

Example 2

A coating composition containing the following ingredients was prepared and placed in a shallow mold. The catalyst was added just before the composition was introduced into the mold:

| | Parts by weight |
|---|---|
| Rigid type polyester resin (Paraplex P43) | 45 |
| Flexible type polyester resin (Paraplex P13) | 15 |
| Methyl ethyl ketone peroxide (catalyst) | 2 |
| Manganese naphthenate (catalyst) | 2 |
| Titanium dioxide (pigment) | 12 |
| Resin coated calcium carbonate (Surfex, believed to be calcium carbonate coated with polydimethyl siloxane resin) (filler) | 19 |
| Bentone 34 (dimethyldioctadecylammonium bentonite) | 2 |
| Monomeric styrene (solvent) | 3 |
| Total | 100 |

To this mixture was added about 1 part of silica sand to 1 part of the mixture and in a second example 2 parts of silica sand to 1 part of the mixture. This silica sand was composed of about 65% by weight of particles of about 40 to 50 sieve size and 35% of about 100 sieve size.

The mold containing the above coating slurry was then placed in a chamber heated to a temperature of about 180° F. for 8 minutes. Approximately 3 to 8 minutes may be employed. At the same time the cinder block to be coated was preheated in the same or a different chamber to a temperature of about 180° F. At this stage the resin had become partially gelled. The preheated block was lowered face down into the mold until it was in contact with the resin in the mold. The mold containing the block and resin material was then heated at the same temperature (180° F.) for an additional period to give a total heating of about 40 minutes. At this time it was found the coating composition had cured sufficiently to become at least partly solid and well anchored to the face of the cinder block. The block in the mold was then subjected to further heating at a temperature of about 320° F. for 20 minutes to complete the curing of the thermosetting resins in the coating composition. The coated block was then removed from the mold and found to have a smooth, decorative face having excellent adhesion to the block and being highly resistant to marring, scratching, thermal shock, staining, crazing or the like. In addition, the coating had rendered this face of the block waterproof and provided a colored surface that was very pleasing and decorative in appearance.

Example 3

Another block was coated according to the procedure described in Example 2 but using the following composition:

| | Parts by weight |
|---|---|
| Rigid type polyester resin (Paraplex P43) | 38 |
| Flexible type polyester resin (Paraplex P13) | 19.5 |
| Benzoyl peroxide (catalyst) | 2 |
| Manganese naphthenate (catalyst) | 1.5 |
| Cobalt naphthenate | 0.5 |
| Titanium dioxide (pigment) | 4.5 |
| Resin coated calcium carbonate (Surfex) (filler) | 20 |
| Bentone #34 | 1.5 |
| Antimony trioxide | 4.5 |
| Chlorinated paraffin | 4.5 |
| Monomeric styrene (solvent) | 3.5 |
| Total | 100 |

To this mixture was added about 1 part of silica sand to 1 part of the mixture and in a second example, 2 parts of silica sand to 1 part of the mixture. This silica sand was composed of about 65% by weight of particles of about 40 to 50 sieve size and 35% of about 100 sieve size.

The block coated with the foregoing composition was similar in appearance and properties to the article obtained according to Example 2, and in this case the coating in addition was rendered incombustible for all practical purposes by the presence of the antimony dioxide and chlorinated paraffin. The time and temperature of treatment is the same as in Example 2.

Example 4

A particularly suitable coating composition for cinder or slag block or the like is as follows:

| | Parts by weight |
|---|---|
| Mixture of sands containing about 60% size 16–40 mesh and balance size 40–300 mesh | 5 |
| Liquid composed of 40% resin solids (80% rigid type "Paraplex 43" resin and 20% flexible type "Paraplex 13" resin and 60% styrene | 2 |

To the foregoing may be added about 2% by weight of asbestine or diatomaceous earth, a catalyst such as methyl ethyl ketone peroxide in an amount equal to about 4% of the liquid and, if desired, suitable amounts of pigment and fire-proofing materials such as antimony oxide and chlorinated paraffin.

The foregoing mix forms a thick slurry which can be readily sprayed or extruded into the molds. Usually spraying gets out any air which may have been trapped in the mix, but if the slurry is extruded or otherwise placed in the mold, it may be desirable to vibrate the mold containing the slurry in accordance with the preferred procedure described hereinabove to be sure that trapped air is removed before the block is placed on top of the slurry in the mold. The blocks are then placed in the molds on top of the layer of slurry and passed through a curing oven on a conveyor. Because of the possibility of varying moisture content in the blocks themselves, it is best to heat the molds from underneath. A dry heating cycle of 40 minutes at 200°–225° F. followed by 20 minutes at 400°–450° F. has been found satisfactory, the temperature being those of the hot gases supplied to the underneath portion of the molds.

Example 5

A solid polyester resin was prepared from 1266 pounds phthalic anhydride, 636 pounds maleic anhydride, 501 pounds dipropylene glycol and 855 pounds of propylene glycol. This resin which possessed an acid number of 35, was admixed with 1.32 pounds of hydroquinone as an inhibitor. This mixture of resin and inhibitor was diluted with 1284 pounds of styrene.

To 52 pounds of this resin, inhibitor and styrene mixture, there were added 1.5 pounds of benzoyl peroxide and 1.5 pounds of methyl ethyl ketone peroxide as well as 1.5 pounds of manganese naphthenate, 0.5 pound of cobalt naphthenate, 4.5 pounds of titanium dioxide (pigment), 1.5 pounds of Bentone 34, 5 pounds of antimony trioxide, 10 pounds of solid chlorinated paraffin and 18 pounds of styrene.

To one pound of the above composition, there is added 3.2 pounds of graded silica sand (of the same composition as in Example 1) and a slag-masonry load bearing block was coated with this slurry in the manner described in the drawings, namely by placing the block face down into a mold containing the slurry. The block and mold were then placed in a chamber heated to about 200° F. for 1 hour and the block was then removed from the mold and allowed to cool. The block had a smooth decorative face of the resin composition which had permeated the surface of the block. The face of the block was highly resistant to marring, scratching, staining, crazing, and thermal shock and was also waterproof.

Example 6

This example is identical with Example 5 except that in place of 3.2 pounds of sand there were employed 0.6 pound of a ceramic frit coated colored rock granule (40 mesh) and 2.6 pounds of ungraded sand of 30 to 160 mesh (having a variable concentration of different particle sizes). The final block had a pleasing mottled appearance which did not show scratch marks and other slight damages which might occur in use when solid colors are employed. In its other properties it was substantially identical with the block prepared in Example 5.

I have found that it is particularly desirable in the coating mixture to employ at least about 50% by weight of sand or other inert filler materials, and at least about 10% by weight of the resin solids and polymerizable solvent, if one is to obtain the best physical properties in the coating layer. That is, the sand is present in an amount of at least 50% and not over 90% of the total of the resin, monomer and filler by weight.

It will be apparent from the foregoing that by the procedure of my invention, masonry building units can be given any desired finish on one or more faces by casting a resinous coating composition on the face, utilizing the weight of the block to supply the necessary pressure during curing of the resin. In this process it is highly desirable that thermosetting resins be used which are 100% reactive and which cure by polymerization or co-polymerization so that no volatile by-products are given off during the curing cycle. Also, it is most desirable to avoid the use of volatile solvents in the resinous mix for the same reason. If the coating composition contains volatile components, holes and bubbles are likely to result in cured coating. This feature of employing materials which do not volatilize or decompose during curing constitutes an important feature of my invention.

The coated products thus made may be made up into wall and building structures in the usual manner by application of mortar to the uncoated sides, and thus produce a structure that requires no surface treatment or finish but which is highly attractive and serviceable. The resinous coating is impervious to water and other liquids, including ink. Its surface is extremely hard and tough, being able to withstand hammer blows without denting or cracking. Unless otherwise stated, all proportions are proportions by weight.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A masonry block having an integral molded facing layer of a composition comprising the reaction product of an ethylenically unsaturated alkyd resin and a polymerizable vinyl monomer and sand as a filler, the latter being in an amount of at least fifty percent and not over 90% of the total of the resin, monomer and filler by weight, the composition of said facing layer permeating the adjacent surface of said block, said composition being cured to permanently interlock said facing layer and block and to form a facing layer having a hard, abrasion resistant surface substantially free of pits and pinholes and possessing elasticity enabling the layer to be resistant to peeling, crazing and cracking due to blows and to differences in coefficients of expansion and contraction between the said block and the said facing thereon.

2. The method of providing a masonry block with an integral facing layer which comprises placing in a mold a composition comprising an ethylenically unsaturated alkyd resin and a polymerizable vinyl monomer and sand as a filler, the latter being in an amount of at least fifty percent and not over 90% of the total of the resin, monomer and filler by weight, said composition being heat convertible and curing without formation of volatile by-products, introducing said block into the mold with the surface to be provided with the facing downward while the composition is in a semi-liquid condition and capable of permeating into the surface of said block, and curing the composition while said unit is in the mold in contact therewith, whereby to permanently interlock said facing layer and block and to form a facing layer having a hard, abrasion resistant surface substantially free of pits and pinholes and possessing elasticity enabling the layer to be resistant to peeling, crazing and cracking due to blows and to differences in coefficients of expansion and contraction between the said block and the said facing thereon.

3. A masonry block according to claim 1, wherein the sand is silica sand and comprises about 3.2 parts by weight for each 4.2 parts by weight of total composition.

4. A masonry block according to claim 1, wherein the sand comprises rounded particles of graded particle size which vary from about 30 mesh to about 325 mesh.

5. A masonry block according to claim 1, wherein the vinyl monomer is styrene.

6. A masonry block according to claim 1, wherein the block is made of clay.

7. A masonry block according to claim 1, wherein the alkyd resin is made from a glycol and an ethylenically unsaturated dicarboxylic acid.

8. A masonry block according to claim 1, wherein the block is a cinder block, the ethylenically unsaturated alkyd resin is made from a glycol and an ethylenically unsaturated dicarboxylic acid, the vinyl monomer is styrene, the ethylenically unsaturated alkyd resin comprising about 30% to 85% by weight of the resinous material and the remainder consisting essentially of styrene, and the sand is silica sand.

9. A method according to claim 2, for providing a masonry block with an integral facing layer, which method comprises incorporating a cation modified clay in which the exchangeable cation is an onium base into the coating composition prior to applying it to the masonry block.

10. A method according to claim 9, for providing a masonry block with an integral facing layer, wherein the cation modified clay is bentonite in which the exchangeable cation is a quaternary ammonium base and the cation modified bentonite constitutes from about 1.5% to 2% by weight of resinous material.

References Cited in the file of this patent

UNITED STATES PATENTS

| 461,890 | Richardson | Oct. 27, 1891 |
| 833,455 | Gerald | Oct. 16, 1906 |
| 909,792 | Henderson | Jan. 12, 1909 |
| 939,966 | Baekeland | Nov. 16, 1909 |
| 1,162,172 | Jones | Nov. 30, 1915 |
| 1,516,890 | Pochin | Nov. 25, 1924 |
| 1,899,137 | Crume | Feb. 28, 1933 |
| 2,193,635 | Marshall | Mar. 12, 1940 |
| 2,294,556 | Henderson | Sept. 1, 1942 |
| 2,392,551 | Roe | Jan. 8, 1946 |
| 2,444,532 | Richardson | July 6, 1948 |
| 2,537,520 | Eger | Jan. 9, 1951 |
| 2,601,532 | Knighton | June 24, 1952 |
| 2,667,664 | Ferrell | Feb. 2, 1954 |

OTHER REFERENCES

Modern Plastics, pp. 111–115, October 1947.

Ind. and Eng. Chem., vol. 40, No. 3, pp. 400–405 March 1948.